(12) United States Patent
Chen (10) Patent No.: US 12,274,256 B2
(45) Date of Patent: Apr. 15, 2025

(54) RODENT TRAP AND METHOD OF USING IT

(71) Applicant: Owltra Tech Co. Ltd., Denver, CO (US)

(72) Inventor: Hongguang Chen, Ningbo (CN)

(73) Assignee: Owitra Tech Co., Ltd., Denver, CO (US)

( * ) Notice: Subject to any disclaimer, the term of this patent is extended or adjusted under 35 U.S.C. 154(b) by 205 days.

(21) Appl. No.: 18/049,847

(22) Filed: Oct. 26, 2022

(65) Prior Publication Data

US 2023/0066844 A1    Mar. 2, 2023

Related U.S. Application Data

(60) Continuation-in-part of application No. 17/495,647, filed on Oct. 6, 2021, now abandoned, which is a
(Continued)

(30) Foreign Application Priority Data

Sep. 12, 2019 (CN) .......................... 201910867252.7
Oct. 26, 2021 (CN) .......................... 202122616809.5

(51) Int. Cl.
*A01M 23/38* (2006.01)
(52) U.S. Cl.
CPC .................................. *A01M 23/38* (2013.01)
(58) Field of Classification Search
CPC ...... A01M 23/38; A01M 23/00; A01M 23/16; A01M 23/18; A01M 23/20; A01M 23/08; A01M 23/14
(Continued)

(56) References Cited

U.S. PATENT DOCUMENTS 3,815,278 A * 6/1974 Beaton ................... A01M 23/38
                                                                  43/99
4,612,724 A * 9/1986 Alboainin ............. A01M 27/00
                                                                  43/79
(Continued)

FOREIGN PATENT DOCUMENTS

CN       102524235 A   *   7/2012
CN       102939952 A   *   2/2013
(Continued)

*Primary Examiner* — Darren W Ark
(74) *Attorney, Agent, or Firm* — Princeton IP Law LLC (57) ABSTRACT

A rodent trap including a cage having a top portion and a bottom portion. The top portion and the bottom portion forms a chamber; an entrance adjacent to one end of the cage, the entrance located on a side wall of the bottom portion; discharge plates positioned within the chamber, the discharge plates coupled to a power supply; a passive infrared sensor located adjacent to the entrance, the passive infrared sensor configured to detect a motion within the chamber; an infrared sensor including an infrared emitter and an infrared receiver, the infrared sensor located adjacent to another end of the cage; a control circuit board coupled to the discharge plates, the control circuit board configured to set the rodent trap in a standby mode, the control circuit board configured to exit the standby mode and activate the infrared sensor upon receiving a motion signal from the passive infrared sensor, and the control circuit board further configured to supply a high voltage to the discharge plates upon receiving an interruption signal from the infrared sensor.

20 Claims, 9 Drawing Sheets

Related U.S. Application Data division of application No. 16/801,076, filed on Feb. 25, 2020, now Pat. No. 11,464,222.

(58) Field of Classification Search
USPC .................................. 43/98, 99, 58, 60, 61
See application file for complete search history.

(56) References Cited

U.S. PATENT DOCUMENTS

| | | | | |
|---|---|---|---|---|
| 5,560,146 | A * | 10/1996 | Garro | A01M 1/02 43/111 |
| 5,815,982 | A * | 10/1998 | Garretson | A01M 1/12 43/73 |
| 5,918,409 | A * | 7/1999 | Carnwath | A01M 23/12 43/99 |
| 5,953,853 | A * | 9/1999 | Kim | A01M 23/38 43/61 |
| 6,016,623 | A * | 1/2000 | Celestine | A01M 31/002 43/61 |
| 6,202,340 | B1 * | 3/2001 | Nieves | A01M 23/20 43/61 |
| 6,445,301 | B1 * | 9/2002 | Farrell | A01M 31/002 340/567 |
| 6,735,899 | B1 * | 5/2004 | Anderson | A01M 23/04 43/98 |
| 6,807,767 | B1 * | 10/2004 | Schade | A01M 23/30 43/77 |
| 6,865,843 | B1 * | 3/2005 | Jordan, Sr. | A01M 23/12 43/60 |
| 7,219,466 | B2 * | 5/2007 | Rich | A01M 23/38 43/98 |
| 7,690,147 | B2 * | 4/2010 | Wetzel | A01M 23/38 43/98 |
| 7,757,430 | B2 * | 7/2010 | Wetzel | A01M 31/002 43/99 |
| 8,024,888 | B2 * | 9/2011 | Wetzel | A01M 31/002 43/99 |
| 8,099,900 | B2 * | 1/2012 | Rivera | A01M 31/002 43/112 |
| 8,365,995 | B2 * | 2/2013 | Jiang | G06M 11/00 43/107 |
| 10,143,193 | B2 * | 12/2018 | Noe | G01J 5/0025 |
| 11,083,188 | B2 * | 8/2021 | Pinzone | A01M 31/002 |
| 11,464,222 | B2 * | 10/2022 | Chen | A01M 23/38 |
| 11,564,385 | B2 * | 1/2023 | Daly, Jr. | A01M 31/002 |
| 12,010,985 | B2 * | 6/2024 | Kaye | A01M 23/38 |
| 12,089,583 | B2 * | 9/2024 | Krehel | A01M 23/30 |
| 2003/0131522 | A1 * | 7/2003 | Swift | A01M 23/04 43/98 |
| 2005/0097808 | A1 * | 5/2005 | Vorhies | A01M 23/20 43/61 |
| 2005/0235553 | A1 * | 10/2005 | Rail | A01M 23/38 43/58 |
| 2006/0032110 | A1 * | 2/2006 | Yang | A01M 1/026 43/60 |
| 2006/0123693 | A1 * | 6/2006 | Muller | A01M 31/002 43/99 |
| 2006/0150470 | A1 * | 7/2006 | Ronnau | H04M 11/002 43/132.1 |
| 2006/0265941 | A1 * | 11/2006 | Newton | A01M 31/002 43/60 |
| 2008/0236023 | A1 * | 10/2008 | Thomas | A01M 23/32 43/58 |
| 2009/0102600 | A1 * | 4/2009 | Noe | A01M 31/002 340/3.1 |
| 2009/0172995 | A1 * | 7/2009 | Wetzel | A01M 23/38 43/98 |
| 2009/0205244 | A1 * | 8/2009 | Pomerantz | A01M 23/18 43/61 |
| 2009/0313880 | A1 * | 12/2009 | Bucher | A01M 23/14 43/99 |
| 2010/0146839 | A1 * | 6/2010 | Cruz | A01M 23/38 43/99 |
| 2011/0109460 | A1 * | 5/2011 | Lloyd | A01M 31/002 340/573.2 |
| 2011/0138676 | A1 * | 6/2011 | Moustirats | A01M 23/20 43/61 |
| 2012/0285075 | A1 * | 11/2012 | Lubic | A01M 23/38 43/60 |
| 2013/0174469 | A1 * | 7/2013 | Kittelson | A01M 23/18 43/61 |
| 2014/0013649 | A1 * | 1/2014 | Rivera | A01M 23/38 43/99 |
| 2014/0018051 | A1 * | 1/2014 | Frojmovics | H04W 4/16 455/414.1 |
| 2014/0055270 | A1 * | 2/2014 | Perry | G08B 21/18 340/573.2 |
| 2014/0283435 | A1 * | 9/2014 | Galeb | A01M 1/106 43/107 |
| 2015/0150236 | A1 * | 6/2015 | Grant | A01M 23/38 43/99 |
| 2015/0351378 | A1 * | 12/2015 | Zero | A01M 23/08 43/62 |
| 2016/0277688 | A1 * | 9/2016 | Gaskamp | H04N 23/661 |
| 2016/0302402 | A1 * | 10/2016 | Fritzbøger | A01M 23/16 |
| 2017/0035040 | A1 * | 2/2017 | Hobbs | H04N 23/56 |
| 2017/0035041 | A1 * | 2/2017 | Othon | A01M 23/20 |
| 2017/0215407 | A1 * | 8/2017 | Pinzone | A01M 23/16 |
| 2017/0231215 | A1 * | 8/2017 | Barton | A01K 29/005 43/60 |
| 2018/0139949 | A1 * | 5/2018 | Liu | A01M 99/00 |
| 2018/0199565 | A1 * | 7/2018 | Zosimadis | A01M 23/00 |
| 2018/0249699 | A1 * | 9/2018 | Daly, Jr. | A01M 23/38 |
| 2018/0325093 | A1 * | 11/2018 | Vickery | A01M 23/18 |
| 2019/0029246 | A1 * | 1/2019 | Kletzli | A01M 23/38 |
| 2019/0364876 | A1 * | 12/2019 | Kletzli | A01M 23/08 |
| 2020/0187486 | A1 * | 6/2020 | Chen | A01M 23/38 |
| 2020/0253187 | A1 * | 8/2020 | Files | A01M 19/00 |
| 2022/0039369 | A1 * | 2/2022 | Shiels | A01M 23/16 |
| 2022/0071193 | A1 * | 3/2022 | Spica | H03K 17/9505 |
| 2022/0225605 | A1 * | 7/2022 | LaRoque | A01M 23/245 |
| 2022/0232817 | A1 * | 7/2022 | Fuligni | A01M 23/06 |
| 2022/0338460 | A1 * | 10/2022 | Miao | A01M 23/38 |
| 2023/0064810 | A1 * | 3/2023 | Feng | A01M 23/38 |
| 2023/0130763 | A1 * | 4/2023 | Schlichter | A01M 23/265 43/81 |
| 2023/0189780 | A1 * | 6/2023 | Barlow | A01M 23/38 43/114 |
| 2023/0309546 | A1 * | 10/2023 | Krehel | A01M 23/14 43/58 |
| 2024/0415108 | A1 * | 12/2024 | Krehel | A01M 27/00 |

FOREIGN PATENT DOCUMENTS

| | | | | |
|---|---|---|---|---|
| CN | 103081890 | A * | 5/2013 | |
| CN | 104222062 | A * | 12/2014 | |
| CN | 204466718 | U * | 7/2015 | |
| CN | 105028381 | A * | 11/2015 | |
| CN | 107047525 | A * | 8/2017 | A01M 23/38 |
| CN | 207167550 | U * | 4/2018 | |
| CN | 208318079 | U * | 1/2019 | |
| CN | 208798587 | U * | 4/2019 | A01M 23/20 |
| CN | 109938002 | A * | 6/2019 | |
| CN | 110463683 | A * | 11/2019 | A01M 23/38 |
| CN | 212660934 | U * | 3/2021 | |
| CN | 112970724 | A * | 6/2021 | A01M 1/103 |
| CN | 213639426 | U * | 7/2021 | |
| CN | 113375769 | A * | 9/2021 | |
| CN | 215012967 | U * | 12/2021 | |
| CN | 215123666 | U * | 12/2021 | |
| CN | 114451395 | A * | 5/2022 | |
| JP | 2019076024 | A * | 5/2019 | |
| JP | 6973715 | B2 * | 12/2021 | |
| WO | WO-2007123755 | A2 * | 11/2007 | |
| WO | WO-2018160831 | A1 * | 9/2018 | A01M 23/38 |
| WO | WO-2021070153 | A1 * | 4/2021 | A01M 23/38 |

* cited by examiner

RODENT TRAP AND METHOD OF USING IT

CROSS-REFERENCE TO RELATED CASES

This application is a continuation-in-part of non-provisional U.S. patent application Ser. No. 17/495,647, filed Oct. 6, 2021, titled RODEN TRAP AND METHOD OF USING IT, and naming inventor Hongguang Chen, which is currently co-pending. This application claims priority to Chinese Patent Application No. CN202122616809.5, filed Oct. 26, 2021, granted on Apr. 5, 2022. The entire contents of the above-referenced applications and of all priority documents referenced in the Application Data Sheet filed herewith are hereby incorporated by reference for all purposes.

TECHNICAL FIELD OF THE INVENTION

The present invention relates to a rodent trap for trapping rodents and a method of using the rodent trap.

BACKGROUND

Rodents, such as rats, mice, are considered pests that damage crops and spread diseases. Wire snap trap requires no chemical or poisons, but children and adult can accidentally get hurt by them. Another method for trapping rodents requires giving high-voltage electric shocks to the rodent, but injuries happen if the trap is triggered by mistake. Besides, rodents may easily escape from the traps. Powered by batteries may not be feasible for some kinds of rodent traps that require staying in standby mode for a long time before catching any rodents.

SUMMARY

Devices and methods as described herein relate to rodent traps and methods of using rodent traps. These devices, methods, and techniques allow rodent traps to operate under different environments, including an environment with high humidity, such as outdoors.

Disclosed herein is a rodent trap including a cage including a top portion and a bottom portion, wherein the top portion and the bottom portion forms a chamber; an entrance adjacent to one end of the cage, the entrance located on a side wall of the bottom portion; discharge plates positioned within the chamber, the discharge plates coupled to a power supply; a passive infrared sensor located adjacent to the entrance, the passive infrared sensor configured to detect a motion within the chamber; an infrared sensor including an infrared emitter and an infrared receiver, the infrared sensor located adjacent to another end of the cage; a control circuit board coupled to the discharge plates, the control circuit board configured to set the rodent trap in a standby mode, the control circuit board configured to exit the standby mode and activate the infrared sensor upon receiving a motion signal from the passive infrared sensor, and the control circuit board further configured to supply a high voltage to the discharge plates upon receiving an interruption signal from the infrared sensor.

According to an embodiment, the rodent trap is in standby mode, the passive infrared sensor is active and the infrared sensor is off.

According to an embodiment, the bottom portion comprises a fence extending from the side wall toward an interior of the chamber, the fence configured to direct a rodent to enter the interior of the chamber.

According to an embodiment, the bottom portion includes a support placed between the discharge plates and a bottom surface of the bottom portion, the support configured to elevate the discharge plates away from the bottom surface.

According to an embodiment, the support includes a series of ribs.

According to an embodiment, the discharge plates comprise a first discharge plate adjacent to the entrance, a second discharge plate adjacent to the bait region, and a third discharge plate between the first discharge plate and the second discharge plate, and wherein the first discharge plate and the second discharge plate are short-circuited to each other.

According to an embodiment, the discharge plates include a first discharge plate having one end adjacent to the entrance and a second end adjacent to the bait region opposite the entrance, and wherein the discharge plates include a second discharge plate placed between the two ends of the first discharge plate.

According to an embodiment, the rodent trap further comprises mounting legs extended downward from the top portion and away from the entrance, the mounting legs configured to host the infrared emitter and the infrared receiver.

According to an embodiment, the rodent trap further comprises a module coupled to the control circuit board, the module configured to detect an electric resistance change between the discharge plates.

According to an embodiment, the control circuit board exits the standby mode and activates the infrared sensor upon the electric resistance between adjacent pair of discharge plates below a threshold.

According to an embodiment, the rodent trap further comprises a waterproof cap configured to cover the top portion Disclosed herein is a method of using a rodent trap setting the rodent trap in an standby mode, the standby mode indicated by an indicator light flashing at a frequency and an alarm sound played, wherein the passive infrared sensor is active and the infrared sensor is off in the standby mode; detecting a motion within the chamber by the passive infrared sensor; exiting the standby mode whereupon the motion within the chamber is detected; activating the infrared sensor, wherein the infrared sensor comprises an infrared emitter and an infrared receiver, the infrared sensor located away from an entrance; and supplying a high voltage to discharge plates positioned within the rodent trap whereupon the control circuit board receives an interruption signal from the infrared sensor.

According to an embodiment, the rodent trap comprises a bottom portion having a fence extending from the side wall toward an interior of the rodent trap, the fence configured to direct a rodent to enter the interior of the rodent trap.

DETAILED DESCRIPTION

In the following detailed description, reference is made to the accompanying drawings, which form a part hereof. In the drawings, similar symbols typically identify similar components unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1:
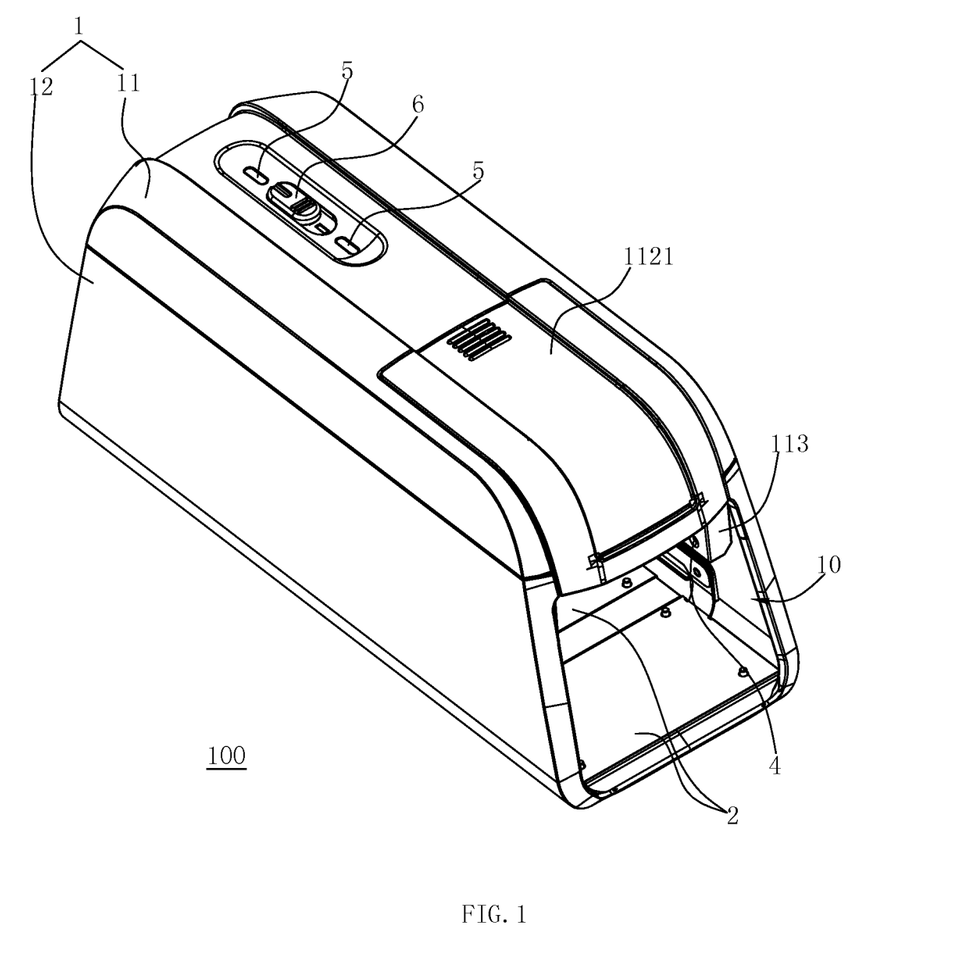
FIG. 1 is a perspective side view of an example rodent trap, according to an embodiment of the present invention.

FIG. 1 is a perspective side view of a rodent trap 100, according to an embodiment of the present invention. A rodent trap 100 comprises a cage 1 having an entrance 10 configured to allow a rodent such a rat or a mouse to enter the cage 1. The cage may further comprise an upper shell 11 and a lower shell 12. The rodent trap 100 further comprises discharge plates 2 on an inner surface of the cage 1 and spaced apart from each other. The rodent trap 100 further comprises a first infrared sensor 3 (see discussion below, not shown in FIG. 1) and a second infrared sensor 4.

Figure 4:
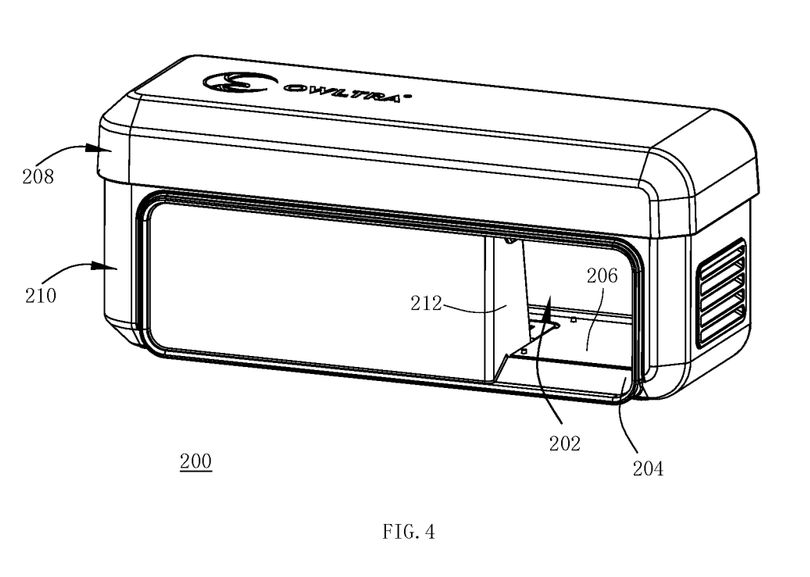
FIG. 4 is a perspective side view of another example rodent trap, according to an embodiment of the present invention.

The upper shell 11 may include an indicator light 5, a power switch 6 and a battery holder 1121. The upper shell 11 may include mounting legs 113 that are extended towards discharge plates 2 on the lower shell 12. The mounting legs 113 may be located on the sides of the cage 1 in pairs. As discussed below, the first infrared sensor 3 and the second infrared sensor 4 may be located on the mounting legs 113. The entrance 10 may be located at the front end of the cage 1, or on a sidewall near the rear end of the cage 1, as shown in FIG. 4.

Figure 2:
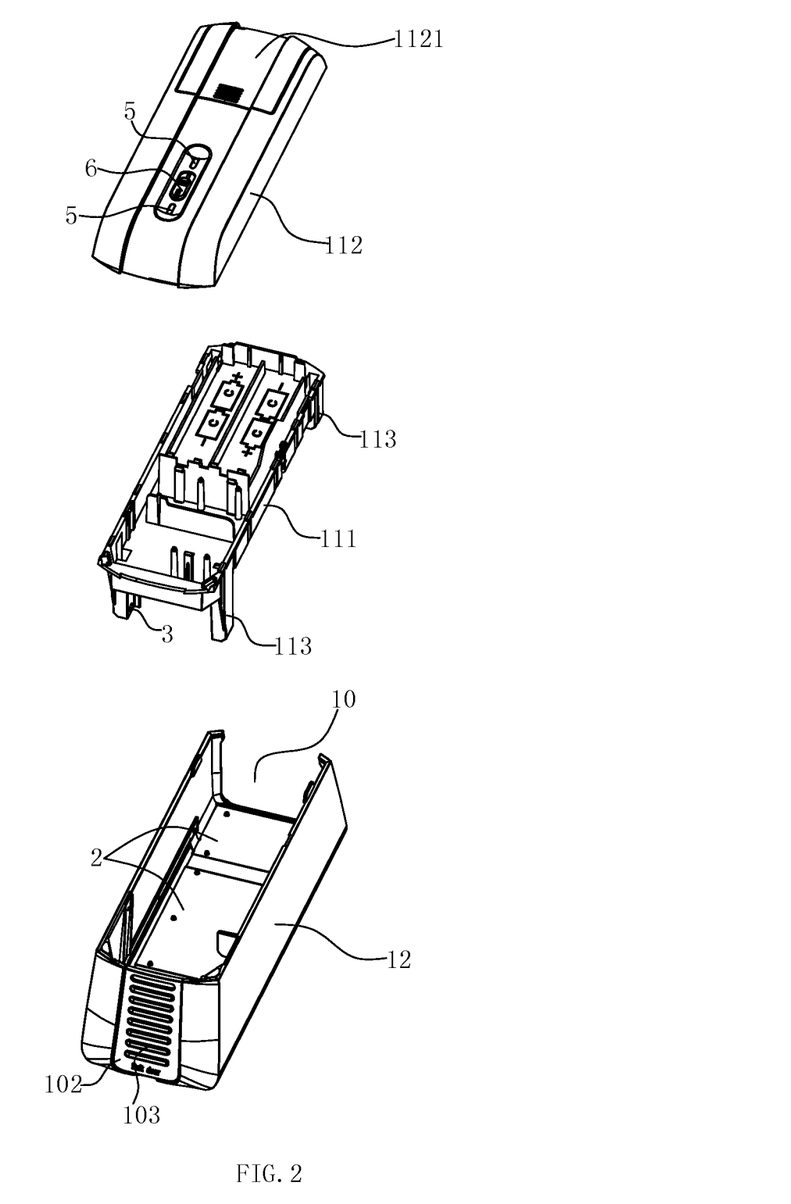
FIG. 2 is an exploded perspective side view of the rodent trap of FIG. 1, according to an embodiment of the present invention.

FIG. 2 is an exploded perspective view of the rodent trap 100, according to an embodiment of the present invention. According to an embodiment, the rodent trap 100 comprises a control circuit board that may be placed inside a chamber formed by a mounting substrate 111 and a cover 112 that is covered on the mounting substrate 111. The control circuit board may include a controller and a peripheral circuit electrically connected to the controller. The control circuit board may be provided with a plug capable of being electrically connected to an external power supply, or to a battery that may be mounted in the chamber to supply power to the control circuit board. The battery holder 1121 may be located in the chamber. The battery holder 1121 is electrically connected to the control circuit board, and one or more batteries can be connected to the control circuit board after the batteries are mounted in the battery holder 1121. As an example, four batteries may be used for supplying power. Meanwhile, the battery holder 1121 may have a battery cover that can be detached. The indicator light 5 may be embedded on the shell cover 112, and the indicator light 5 may be electrically connected to the control circuit board, so that the operating state of the rodent trap 100 is indicated in response to the control circuit board. Additionally, the power switch 6 may be electrically connected to the control circuit board to control the turn-on or turn-off of the power. The entrance 10, from which the rodent comes into the cage, may be formed in the rear end of the cage 1.

The first infrared sensor 3 includes a first infrared emitter and a first infrared receiver which may be oppositely arranged on two sides in the cage 1 and electrically connected to the control circuit board. An infrared light beam emitted by the first infrared emitter is located above one of the discharge plates 2. When a rodent steps on adjacent pair of the discharge plates 2, the infrared light beam can be prevented from reaching the first infrared receiver by the rodent.

Figure 3:
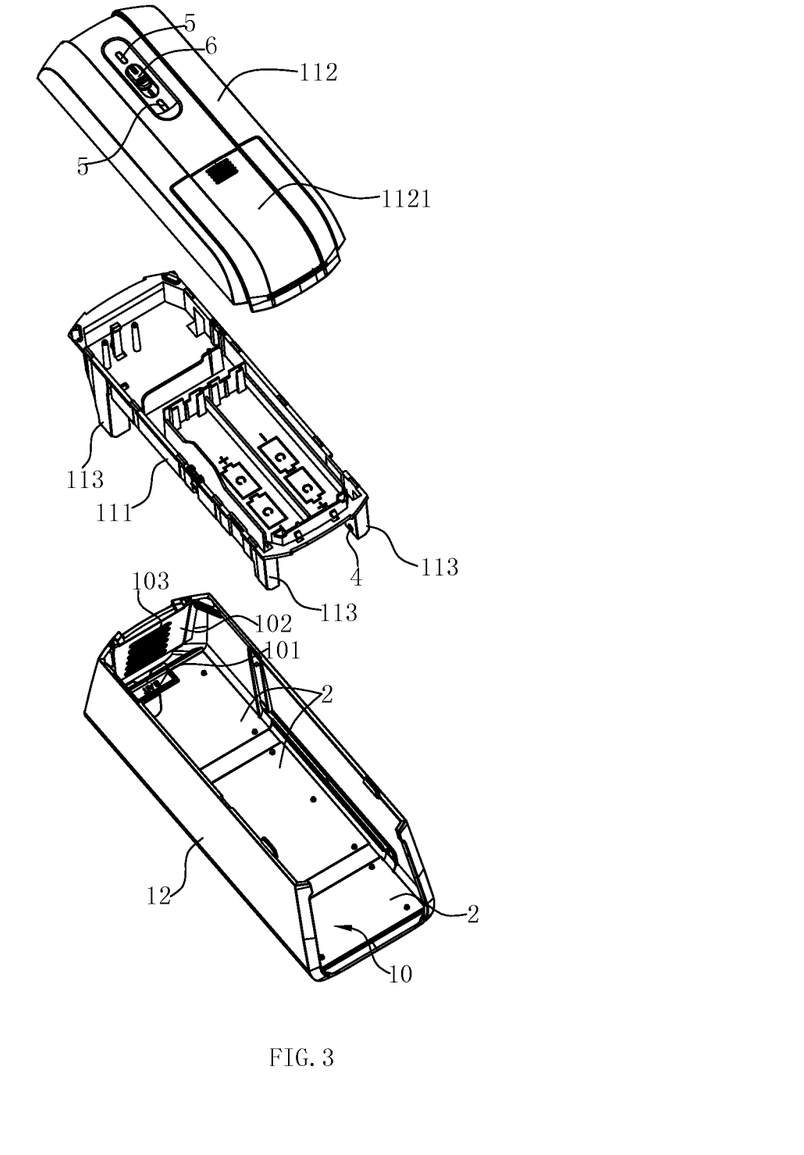
FIG. 3 is another exploded perspective view of the rodent trap of FIG. 1, according to an embodiment of the present invention.

FIG. 3 is another exploded perspective view of the rodent trap 100, according to an embodiment of the present invention. The first infrared sensor 3 may be arranged in the front of the cage 1, and the second infrared sensor 4 may be further arranged in the rear of the cage 1. The second infrared sensor 4 includes a second infrared emitter and a second infrared receiver that are electrically connected to the control circuit board. The second infrared emitter and the second infrared receiver may be separately arranged on two sides of the entrance 10. The second infrared sensor may be closer than the first infrared sensor to the entrance.

The cage 1 may have a bait region 101 for placing the bait. The bait region 101 may include an opening 103 and a baffle 102 where the baffle 102 may be hinged to a wall of the cage 1. The baffle 102 may be covered on a placement port in order to prevent the rodent from escaping from the placement port. There may be one or more openings on the baffle 102 that can help spread the smell of the bait.

The discharge plates 2 may comprise a first discharge plate, a second discharge closer than the first discharge plate to the entrance, and a third discharge plate placed between the first discharge plate and the second discharge plate. The first discharge plate and the second discharge plate are short-circuited to each other, and the third discharge plate is not connected to the first discharge plate and the second discharge plate on the inner surface of the cage.

Two discharge plates 2 may be selectively disposed according to the length of the cage 1, and these discharge plates 2 disposed on a soleplate inside the cage 1 and spaced apart from each other. Each discharge plate 2 being electrically connected to the control circuit board that is configured to establish a voltage between the discharge plates 2.

In one embodiment, two discharge plates 2 are provided. One of the discharge plates may be a rectangular metal plate while the other discharge plate may have two metal plate bodies connected by an elongated metal strip. That is, the two metal plate bodies are short-circuited to each other. The elongated metal strip may be part of one whole piece of metal plate, or a separate piece from the two metal plate bodies but connected with them by a conductive material. The rectangular metal plate may be placed between the two metal plate bodies. The elongated metal strip may surround the rectangular metal plate but not be electrically connected to the rectangular metal plate.

As shown in FIG. 2 and FIG. 3, the first infrared emitter, the first infrared receiver, the second infrared emitter and the second infrared receiver are located respectively on the mounting legs 113 that are extended downward from the mounting substrate 111. The first infrared emitter, the first infrared receiver, the second infrared emitter and the second infrared receiver may be arranged at lower ends of the mounting legs 113. The first infrared emitter and the first infrared receiver may be oppositely arranged on a horizontal line, and the second infrared emitter and the second infrared receiver may be oppositely arranged on another horizontal line. The first infrared receiver can receive an infrared light beam signal emitted by the first infrared emitter when there is no obstacle between the first infrared emitter and the first infrared receiver. Likewise, the second infrared receiver can receive an infrared light beam signal emitted by the second infrared emitter when there is no obstacle between them.

The first infrared emitter and the first infrared receiver may be arranged on two sides in the cage 1 in such a way that the first infrared emitter and the first infrared receiver are close to the discharge plates but not in contact with the discharge plates 2. A distance between the mounting legs 113 and the discharge plates 2 is kept to prevent false alarms triggered by rodents that are not targeted by the present invention such as insects. The length of the mounting legs 113 near the entrance 10 may be the same or shorter than the mounting legs 113 near the opening 103.

The first infrared sensor 3 may be placed close to the bait region 101. In one embodiment, the first infrared sensor 3 may be located near the bait region 101 and the second infrared sensor 4 may be closer to the entrance 10 than the first infrared sensor 3. The first infrared sensor 3 and the second infrared sensor 4 may supply signals to the control circuit separately. For example, when the rodent trap 100 is in activated and the first infrared sensor and the second infrared sensor are operating, a rodent or a person's arm comes into the cage 1 near the entrance 10. The infrared light beam emitted by the second infrared sensor may be blocked by the rodent the person's arm. A voltage greater than 5000 V will be supplied to the discharge plates 2 only when the light beam emitted by the first infrared sensor is blocked, and simultaneously the second infrared receiver is receiving light beam signal from the second infrared sensor.

The present invention provides a method of using the rodent trap 100, the method comprises the following steps.

When the cage 1 is in an initial state in which no rodent comes into the cage 1, the cage 1 is in a low-power-consumption standby state. Both the first infrared sensor 3 and the second infrared sensor 4 are not operating.

Resistance signals on the adjacent pair of discharge plates 2 are monitored. When a rodent or other object comes into the cage and connects adjacent pair of discharge plates 2, the electric resistance between the adjacent pair of discharge plates 2 may change. When electric resistance between the two discharge plates is below a threshold, the control circuit on the control circuit board is woken up from the low-power-consumption standby state. The threshold is of 1M ohms level, which is in the range of skin resistance of a rodent. It is determined that a rodent or an object comes into the cage when the change of resistance is detected.

After the control circuit has woken up, the first infrared sensor 3 and the second infrared sensor 4 are activated to operate. That is, both the first infrared emitter and the second infrared emitter emit infrared light beams. The first infrared receiver and the second infrared receiver keep receiving the infrared light beam from the first infrared emitter and the second infrared emitter correspondingly if there is no obstacle between the infrared emitters and the infrared receivers. The control circuit board receives signals from the first infrared sensor 3 and the second infrared sensor 4 indicating the light beams are in transmission or not.

If the control circuit board acquires a signal indicating that both the infrared light beam from the first infrared sensor 3 and the light beam from the second infrared sensor 4 are blocked or only the light beam from the second infrared sensor 4 is blocked, no high-voltage power (greater than 5000V) is supplied to the discharge plates 2. The control circuit board remains receiving signals from the first infrared sensor and the second infrared sensor. For instance, in a case that a rodent bigger than a mouse, for example a rabbit or cat, comes into the cage 1 or a person's arm comes into the cage 1, the infrared light beam from the first infrared sensor 3 and the second infrared sensor 4 may be blocked. In this case, high-voltage power will not be supplied to the discharge plates 2 and accidental injury is avoided. In a case where only the infrared light beam from the second infrared sensor 4 is blocked, it may be possible that a person's finger or a small rodent's head tentatively comes into the cage 1. In this case, the rodent trap 100 will not supply high-voltage power to the discharge plates 2 to prevent false alarm.

If the control circuit board receives a signal indicating that only the infrared light beam from the first infrared sensor 3 is blocked, and simultaneously the second infrared receiver is able to receive an infrared light beam emitted from the second infrared emitter. When the rodent has at least one foot step on one of the adjacent pair of discharge plates 2 and at least another foot step on one of the adjacent pair of discharge plates 2, the control circuit board supplies high-voltage power to the discharge plates 2. The rodent is trapped in the cage 1 because of the high-voltage power. The high-voltage power supplied to the discharge plates 2 may be in a range of 5000 V to 10000 V. The discharge time of supplying high-voltage power to the discharge plates 2 may be adjusted under different circumstances. The discharge time may be 30 s to 120 s depending upon the operating voltage of the discharge plates 2.

Additionally, after the mouse is trapped, the discharge plates 2, the first infrared sensor 3 and the second infrared sensor 4 are terminated to operate. That is, both of the first infrared emitter and the second infrared sensor stop emitting light beams. Meanwhile, the frequency of flashing of the indicator light 5 on the upper shell 11 may be controlled by the control circuit board. The flashing of the indicator light 5 indicates that there is a trapped rodent in the cage 1. It is convenient for the user to timely handle the trapped rodent. After the trapped rodent in the cage 1 is handled, the rodent trap 100 needs to be manually adjusted to the low-power-consumption standby state.

FIG. 4 is a perspective side view of a rodent trap 200, according to an embodiment of the present invention. The rodent trap 200 shares some common parts and designs with the rodent trap 100 while includes additional features that allow the rodent trap work in various outdoor environments. Detecting a resistance change between adjacent discharge plates may not be as sensitive under humid environment. The rodent trap 200 includes a passive infrared sensor to run in the low-power-consumption standby mode, which is a supplemental mechanism to the resistance detection to activate a infrared sensor and then supply a high power voltage to discharge plates. The following description will focus on the differences and additional features of the rodent trap 200.

Figure 5:
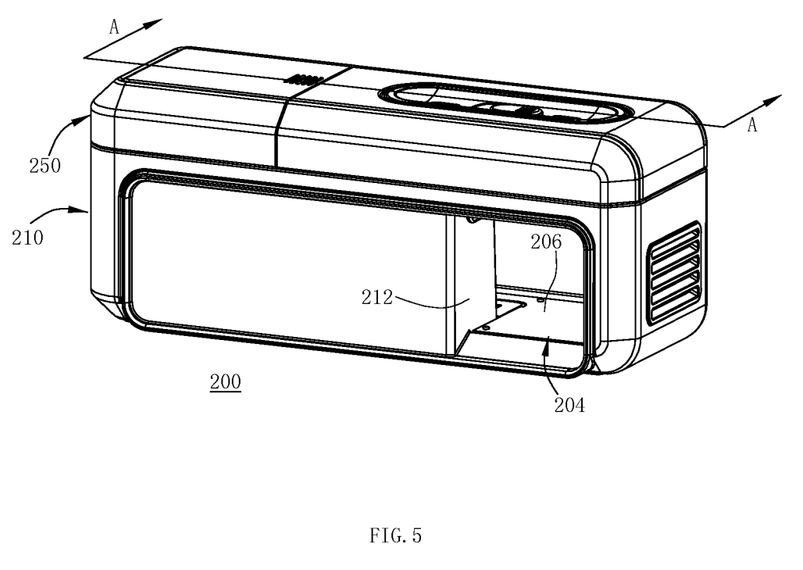
FIG. 5 is another perspective side view of the rodent trap of FIG. 4, according to an embodiment of the present invention.

The rodent trap includes a chamber 202 that is formed by a top portion 250 and a bottom portion 210. In FIG. 4, the top portion 250 (not shown) is covered by a waterproof cap 208 FIG. 5 is another perspective side view of rodent trap 200 with the top portion 250 visible. The waterproof cap 208 can prevent water from entering the top portion 250 and the chamber 202. The waterproof cap 208 can be see through so that a user can see the flashing of indicator lights 266 and 267 (see FIG. 9). The rodent trap 200 has an entrance 204 located on a side wall and near an end of the bottom portion 210. The entrance 204 can be located on either side of the bottom portion 210. One of the benefits of setting the entrance 204 on a sidewall is that it is harder for the rodent to escape from the chamber 202 once it is trapped inside. Another benefit is that an object larger than the entrance 204, such as a human's hand, is not likely to get in the chamber 202 and accidentally trigger the high voltage. Discharge plates 206 are placed within the chamber 202. The discharged plates are connected to a power supply. The power supply can be external batteries, a power bank, or a portable charger. The bottom portion 210 may have a fence 212 extending from the side wall toward an interior of the chamber 202. The fence 212 may guide the rodent to enter the interior of the chamber 202 so that its motion can be detected.

Figure 6:
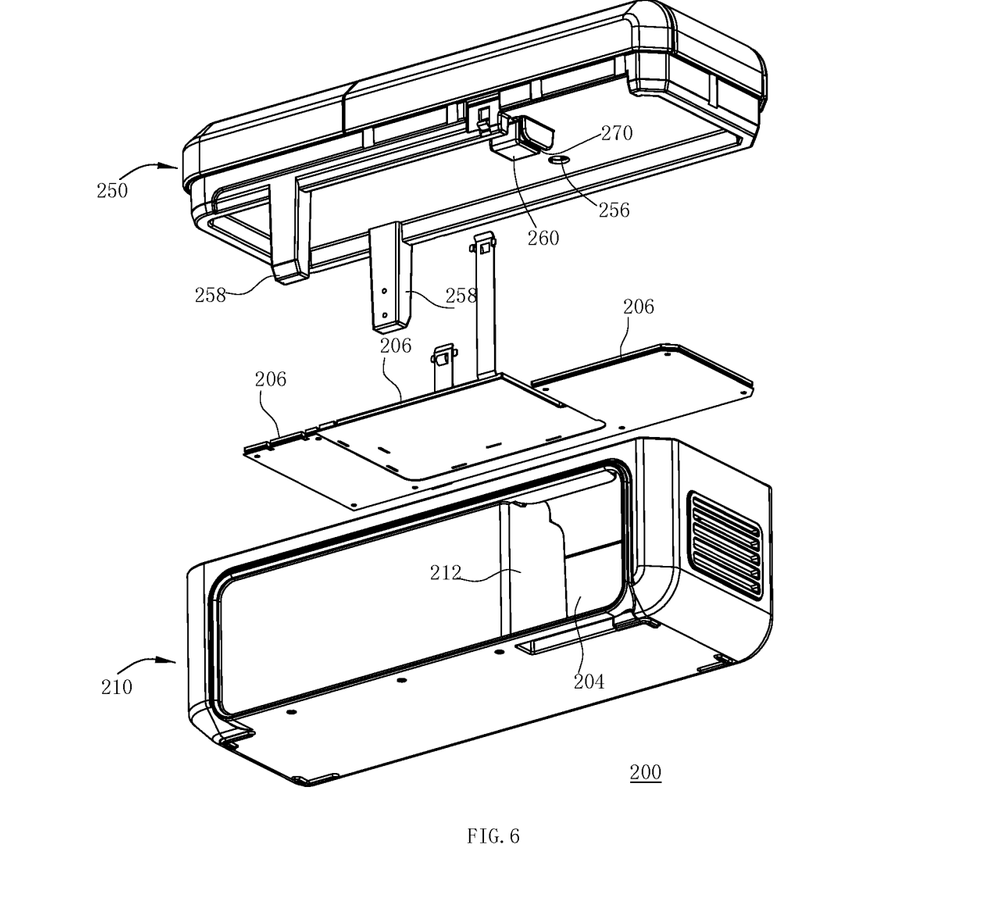
FIG. 6 is an exploded perspective view of the rodent trap of FIG. 4, according to an embodiment of the present invention.

FIG. 6 is an exploded perspective view of the rodent trap 200, according to an embodiment of the present invention. The top portion 250 may have mounting legs 258 extending downward. The mounting legs can be configured to host an infrared emitter and an infrared transmitter, respectively. The top portion 250 may have a passive infrared sensor 256. Other motion sensor, such as an optical sensor, a camera, or a microwave motion detector can substitute the passive infrared sensor. The motion sensor may be covered by a Fresnel lens that does not allow visible light to pass through to avoid the interference of the visible light to the motion detector.

The top portion 250 may have a protruding block 260 to engage with the fence 212. The protruding block 260 may have a groove 270 in length and thickness that mates with the fence 212. The top portion 250 and the bottom portion 210 can be fixed when the fence 212 mates with the groove 270.

In an embodiment, the discharge plates 260 may include a first discharge plate near the entrance 204, a second discharge plate adjacent to the bait region, and a third discharge plate between the first discharge plate and the second discharge plate. The first discharge plate and the second discharge plate are connected and short-circuited to each other. In another example embodiment, the discharge plates 206 may include a first discharge plate having one end adjacent to the entrance and a second end adjacent to the bait region opposite the entrance. The discharge plates may include a second discharge plate placed at a cutout between the two ends of the first discharge plate (see FIG. 6).

Figure 7:
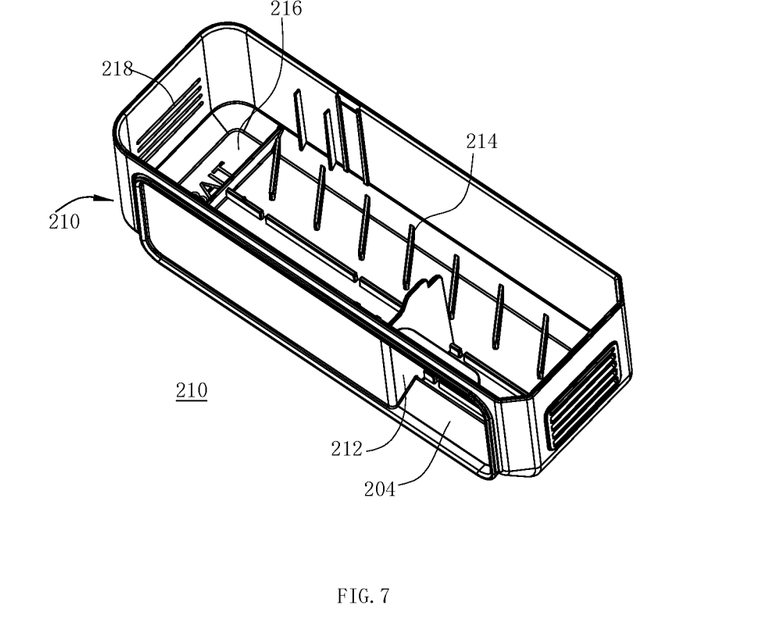
FIG. 7 is a perspective top view of a bottom portion of the rodent trap of FIG. 4, according to an embodiment of the present invention.

FIG. 7 is a perspective top view of the bottom portion 210 of the rodent trap 200, according to an embodiment of the present invention. A bait region 216 is located at another end of the chamber opposite the entrance. A vent outlet 218 next to the bait region 216 can help send out the scent of a bait place inside the bait region 216. The bottom portion 210 may include a support 214 placed between the discharge plates 206 and a bottom surface of the bottom portion 210. The support 214 is configured to elevate the discharge plates 206 away from the bottom surface. The support 214 can be a series of ribs that bear the discharge plates 206 placed on top. The elevated design can lower the chance of the discharge plates 206 in contact with the water entering the bottom portion 210.

Figure 8:
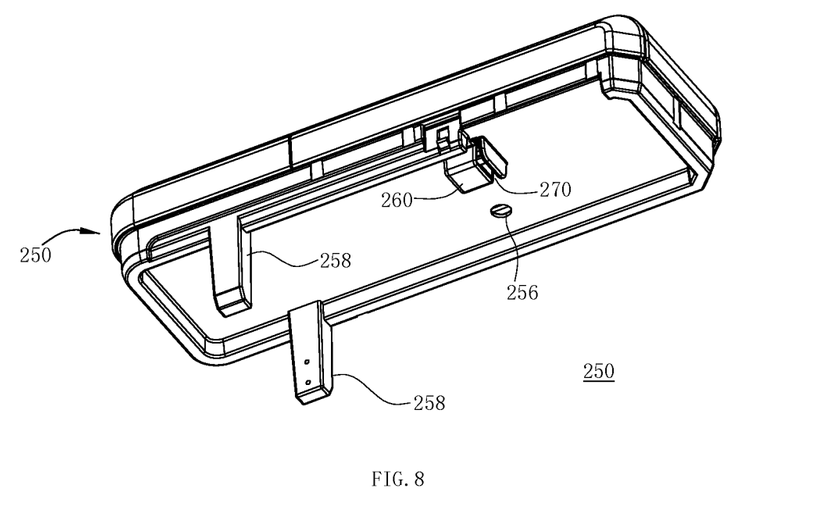
FIG. 8 is a perspective bottom view of a top portion of the rodent trap of FIG. 4, according to an embodiment of the present invention.

FIG. 8 is a perspective bottom view of the top portion 250 of the rodent trap 200, according to an embodiment of the present invention.

Figure 9:
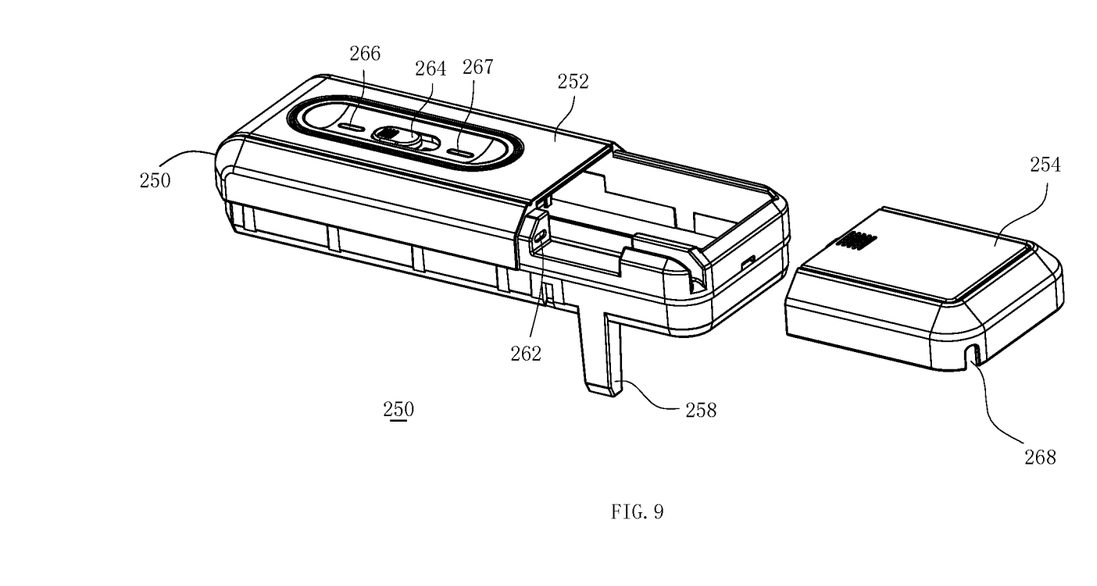
FIG. 9 is an exploded perspective view of the top portion of the rodent trap of FIG. 4, according to an embodiment of the present invention.

FIG. 9 is an exploded perspective view of the top portion 250 of the rodent trap 200, according to an embodiment of the present invention. The top portion 250 may include a first top cover 252 and a second top cover 254. A control circuit board may be placed inside the top portion 250 and covered by the first top cover 252. The top portion 250 may include two indicator lights 266 and 267, and a power switch 264. The control circuit board may be powered by batteries placed within the top portion 250 and covered by the second top cover 254. The control circuit board may be connected to an external charger via USB port 262. A cable plugged in the USB port 262 can be placed under the second top cover 254 and through slot 268.

Figure 10:
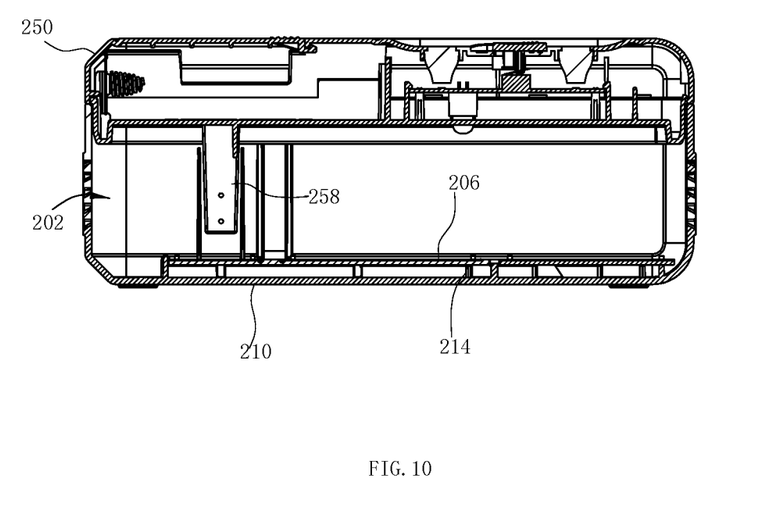
FIG. 10 is a sectional view of FIG. 5 along A-A, according to an embodiment of the present invention.

FIG. 10 is a sectional view of FIG. 5 along A-A, according to an embodiment of the present invention.

In an example embodiment, when the rodent enters the chamber 202, the passive infrared sensor 256 detects a motion and sends a motion signal to the control circuit board. The passive infrared sensor 256 should be always on when the rodent trap 200 is in a low-power-consumption standby mode. The passive infrared sensor 256 is close to the fence 212 and entrance 204 so that the passive infrared sensor 256 can detect the presence of the rodent immediately after the rodent entering the chamber 202. In an example embodiment, the control circuit board then may release the high voltage to the discharge plates 206 right after the motion is detected. In yet another example embodiment, the control circuit board may exit the standby mode, and activate the infrared sensor and wait for the rodent to get closer to the bait region. In this example, the rodent is ensured inside the chamber 202. When the infrared beam between the infrared emitter and transmitter is block, in other words, an interruption signal is received by the control circuit board, the control circuit board supplies high voltage to the discharge plates 206.

The rodent trap 200 may include a wake-up module configured to detect an electric resistance change between the discharge plates 206. The control circuit board may activate the infrared sensor upon the electric resistance between adjacent pair of discharge plates below a threshold. The threshold may be of 1M ohms level that is in the range of skin resistance of a rodent.

An example workflow of the rodent trap 200 is described below.

S1: turn on the power switch 264, check the voltage. If the voltage is within the normal range, go to S2; otherwise, go to S3.

S2: a green light is on for one second, detect if the infrared beam transmission is blocked. If the infrared beam transmission is blocked, go to S4; otherwise, go to S5.

S3: a red light is flashing until the batteries are replaced or the rodent trap connected to a working power supply, go to S1.

S4: the red light and the green light are both flashing until the infrared beam transmission is cleared, go to S5.

S5: turn off the infrared sensor, turn on the passive infrared sensor, and turn on the wake-up module. The rodent trap is now under a lower-power-consumption standby mode.

S6: a rodent enters chamber 202, the passive infrared sensor detects a motion, or both the passive infrared sensor and the wake-up module detect the presence of the rodent. The control circuit board receives a signal indicating the presence of the rodent, exits the standby mode and activate the infrared sensor.

S7: check the infrared beam transmission. If the infrared beam transmission is interrupted, go to S8; otherwise, go to S9.

S8: the control circuit board supplies the high voltage to the discharge plates 206 for 90-300 seconds, the rodent is killed, go to S10.

S9: check if there is an overtime. An overcome means the control circuit board cannot detect interruption signal starting from exiting standby mode until a pre-determined time. If an overtime is detected, go to S5; otherwise, go to S6.

S10: the green light flashes once in every 10 seconds and a buzzer beeps once in every 1 minute, which is a reminder to the user to clean up the dead rodent.

The invention claimed is:

1. A rodent trap comprising:
a cage including a top portion and a bottom portion, wherein the top portion and the bottom portion form a chamber;
an entrance adjacent to one end of the cage, the entrance located on a side wall of the bottom portion;
discharge plates positioned within the chamber, the discharge plates coupled to a power supply;
a passive infrared sensor mounted to the cage and located adjacent to the entrance, the passive infrared sensor configured to detect a motion within the chamber;
an infrared sensor including an infrared emitter and an infrared receiver mounted to the cage, the infrared sensor located next to a bait region opposite of the entrance and configured to form a breakable beam between the infrared emitter and the infrared receiver and across one of the discharge plates;
a control circuit board coupled to the discharge plates, the control circuit board configured to set the rodent trap in a low-power-consumption standby mode, the control circuit board configured to exit the low-power-consumption standby mode and activate the infrared sensor upon receiving a motion signal from the passive infrared sensor, and the control circuit board further configured to supply a high voltage to the discharge plates upon receiving an interruption signal from the infrared sensor when the beam is blocked between the infrared emitter and the infrared receiver.

2. The rodent trap of claim 1, wherein the rodent trap operates at a low power consumption state in the low-power-consumption standby mode, in which the passive infrared sensor is active and the infrared sensor is off.

3. The rodent trap of claim 1, wherein the bottom portion comprises a fence extending from the side wall toward an interior of the chamber, the fence configured to direct a rodent to enter the interior of the chamber.

4. The rodent trap of claim 1, wherein the bottom portion includes a support placed between a surface of the discharge plates and a bottom surface of the bottom portion, the support configured to elevate the discharge plates away from the bottom surface.

5. The rodent trap of claim 4, wherein the support includes a series of ribs.

6. The rodent trap of claim 1, wherein the discharge plates comprise a first discharge plate adjacent to the entrance, a second discharge plate adjacent to the bait region, and a third discharge plate between the first discharge plate and the second discharge plate, and wherein the first discharge plate and the second discharge plate are short-circuited to each other.

7. The rodent trap of claim 1, wherein the discharge plates include a first discharge plate extending from the entrance to the bait region, the first discharge plate having a cutout at a middle section of the chamber, and wherein the discharge plates include a second discharge plate placed at the middle section of the chamber.

8. The rodent trap of claim 1, further comprises mounting legs extended downward from the top portion and positioned away from the entrance, the mounting legs configured to host the infrared emitter and the infrared receiver.

9. The rodent trap of claim 1, further comprises circuitry coupled to the control circuit board, the circuitry configured to detect an electrical resistance change between the discharge plates.

10. The rodent trap of claim 9, wherein the control circuit board exits the low-power-consumption standby mode and activates the infrared sensor upon the electrical resistance between an adjacent pair of the discharge plates being below a threshold.

11. The rodent trap of claim 1, further comprises a waterproof cap configured to cover the top portion.

12. A method of using a rodent trap comprising:
providing the rodent trap of claim 1;
setting the rodent trap in the low-power-consumption standby mode, wherein the rodent trap operates in a low power consumption state, and wherein the passive infrared sensor is active and the infrared sensor is off in the low-power-consumption standby mode;
detecting a motion within the chamber with the passive infrared sensor;
exiting the low-power-consumption standby mode when the control circuit board receives a motion signal from the passive infrared sensor;
activating the infrared sensor via the control circuit board; and
supplying the high voltage to the discharge plates after the control circuit board receives the interruption signal from the infrared sensor when the beam is blocked between the infrared emitter and the infrared receiver.

13. The method of claim 12, wherein the bottom portion comprises a fence extending from the side wall toward an interior of the chamber, the fence configured to direct a rodent to enter the interior of the chamber.

14. The method of claim 12, wherein the bottom portion includes a support placed between a surface of the discharge plates and a bottom surface of the bottom portion, the support configured to elevate the discharge plates away from the bottom surface.

15. The method of claim 14, wherein the support includes a series of ribs.

16. The method of claim 12, wherein the rodent trap comprises:
mounting legs extended downward from the top portion, wherein the mounting legs are configured to host the infrared emitter and the infrared receiver.

17. The method of claim 12, wherein the discharge plates comprise a first discharge plate adjacent to the entrance, a second discharge plate adjacent to the bait region, and a third discharge plate between the first discharge plate and the second discharge plate, and wherein the first discharge plate and the second discharge plate are short-circuited to each other.

18. The method of claim 12, wherein the discharge plates include a first discharge plate extending from the entrance to the bait region, the first discharge plate having a cutout at a middle section of the chamber, and wherein the discharge plates include a second discharge plate placed at the middle second of the chamber.

19. The method of claim 12, wherein the rodent trap further comprises a waterproof cap configured to cover the top portion.

20. The method of claim 12, wherein the control circuit board activates the infrared sensor upon an electrical resistance between an adjacent pair of the discharge plates being below a threshold.

\* \* \* \* \*

UNITED STATES PATENT AND TRADEMARK OFFICE
CERTIFICATE OF CORRECTION

| | | |
|---|---|---|
| PATENT NO. | : 12,274,256 B2 | Page 1 of 1 |
| APPLICATION NO. | : 18/049847 | |
| DATED | : April 15, 2025 | |
| INVENTOR(S) | : Hongguang Chen | |

It is certified that error appears in the above-identified patent and that said Letters Patent is hereby corrected as shown below:

On the Title Page

Assignee should read:
Owltra Tech Co., Ltd., Denver, CO (US)

Signed and Sealed this
Thirteenth Day of May, 2025

Coke Morgan Stewart
*Acting Director of the United States Patent and Trademark Office*